(12) United States Patent
Nagashima et al.

(10) Patent No.: US 7,809,978 B2
(45) Date of Patent: Oct. 5, 2010

(54) STORAGE DEVICE AND CONTROL DEVICE

(75) Inventors: Yasuyuki Nagashima, Kawasaki (JP); Hironori Kanno, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 427 days.

(21) Appl. No.: 11/986,205

(22) Filed: Nov. 20, 2007

(65) Prior Publication Data
US 2008/0209281 A1 Aug. 28, 2008

(30) Foreign Application Priority Data
Feb. 28, 2007 (JP) ............................... 2007-050368

(51) Int. Cl.
*G06F 11/00* (2006.01)
(52) U.S. Cl. ............................................ 714/5; 714/42
(58) Field of Classification Search .................. 714/42, 714/5
See application file for complete search history.

(56) References Cited

U.S. PATENT DOCUMENTS

| | | | | |
|---|---|---|---|---|
| 6,052,804 A | * | 4/2000 | Thowe et al. ............... | 714/710 |
| 6,304,986 B1 | * | 10/2001 | Ma et al. .................... | 714/718 |
| 6,412,089 B1 | * | 6/2002 | Lenny et al. ................ | 714/769 |
| 6,467,054 B1 | * | 10/2002 | Lenny ......................... | 714/42 |
| 7,490,261 B2 | * | 2/2009 | Gaertner et al. ............. | 714/8 |
| 7,519,869 B2 | * | 4/2009 | Mizuno et al. ............... | 714/42 |
| 7,653,847 B1 | * | 1/2010 | Liikanen et al. ............ | 714/723 |
| 2005/0188238 A1 | * | 8/2005 | Gaertner et al. ............. | 714/2 |
| 2006/0294438 A1 | * | 12/2006 | Odawara et al. ............ | 714/42 |
| 2009/0055681 A1 | * | 2/2009 | Dholakia et al. ............ | 714/6 |

FOREIGN PATENT DOCUMENTS

| | | |
|---|---|---|
| JP | 07-182250 | 7/1995 |
| JP | 2000-339107 | 12/2000 |
| JP | 2003-228925 | 8/2003 |
| JP | 2005-190003 | 7/2005 |

* cited by examiner

*Primary Examiner*—Marc Duncan
(74) *Attorney, Agent, or Firm*—Greer, Burns & Crain, Ltd.

(57) ABSTRACT

Data in a storage medium is scanned while a storage device is in an idle state. A proportion of scanned data in entire data in the storage medium is compared with a threshold value. If the proportion of the scanned data is less than the threshold value, an unscanned data in the storage medium is scanned during a time interval between commands received by the storage device from outside. The process is repeated until the proportion of the scanned data is equal to or more than the threshold value.

15 Claims, 4 Drawing Sheets

| TOTAL NUMBER OF TRACKS | COMPLETION PROPORTION [%] | THRESHOLD VALUE PER HOUR [%/h] | THRESHOLD VALUE [%] |
|---|---|---|---|
| AAAA | AA | AA | AA |

181

| COMPULSORY-BMS MONITORING TIME (X) [HOUR] | PERIOD MONITORING TIME (Y) [SECOND] |
|---|---|
| AAAA | AAAA |

182

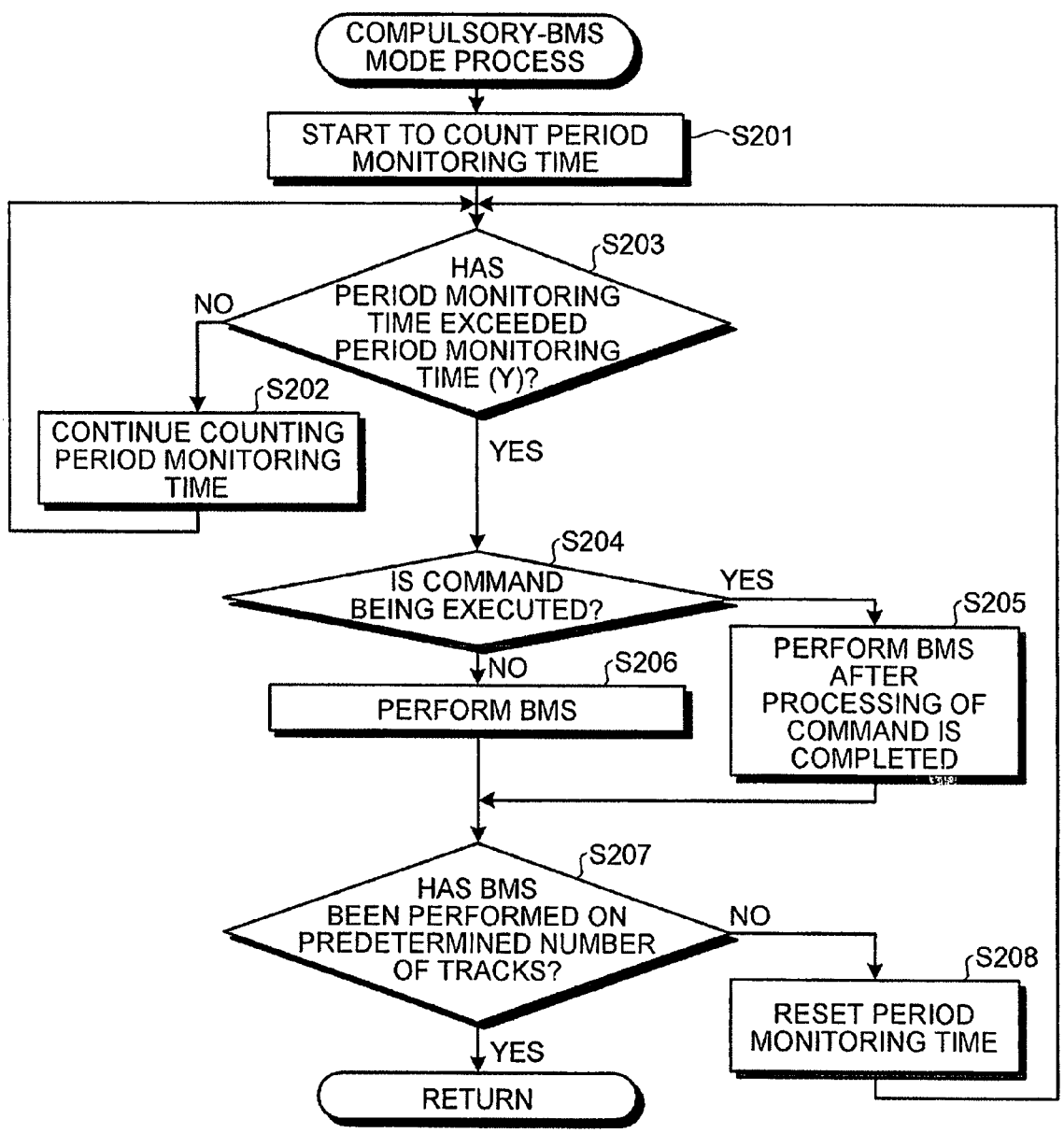

STORAGE DEVICE AND CONTROL DEVICE

BACKGROUND OF THE INVENTION

1. Field of the Invention

The present invention relates to a technology for performing preventive data scan of a disk used in a storage device.

2. Description of the Related Art

Data stored on a disk of a storage device (magnetic disk device) can be damaged due to various reasons. External causes, degradation of disk with time are some examples of such reasons. If data is damaged, e.g., data loss or imperfect data occurs, that data can not be read. The external cause means that data stored in a certain area of a disk is damaged by leakage flux generated when new data is written on an adjacent area of the same disk. Furthermore, the external cause means that part of the stored data is mistakenly overwritten with new data due to vibration of a storage device when new data is written on the adjacent area.

If there is damaged data on a disk, it becomes necessary to check whether the damaged data is recoverable or unrecoverable, and to replace damaged sectors. These processes put extra load on the storage device.

In recent years, there has been made tremendous improvement in storage capacity of disks. Such improvement in the storage capacity has resulted from increase in storage density. Increase in the storage density implies that there are higher chances of data being damaged. In view of these facts, Japanese Patent Application Laid-open No. H7-182250 discloses a technology for ensuring quality of data stored in a disk. Specifically, a read verify operation is performed on the disk while a storage device is in an idle state, i.e., a state where the storage device is not receiving any command or the like from a higher-level device.

The read verify operation includes:
(1) recording information about sectors that have unrecoverable reading error;
(2) rewriting data in sectors that have recoverable reading error; and
(3) replacing a sector if that sector produces some sort of error even after data has been rewritten to that sector.

The processes (1) to (3) are collectively called Background Medium Scan (hereinafter, "BMS"), of which specification is proposed by the American National Standard Institute (ANSI).

However, the BMS of the disk can be performed only when the storage device is in idle state. In other words, the BMS is not suitable to environments where a storage device continuously and periodically receives commands from a higher-level device. RAID (Redundant Arrays of Inexpensive Disks) system is an example where the BMS can not be employed.

SUMMARY OF THE INVENTION

It is an object of the present invention to at least partially solve the problems in the conventional technology.

According to an aspect of the present invention, there is provided a control device that controls a storage device to scan data stored in a storage medium of the storage device to locate and correct error in the data. The control device includes a first scanning unit that causes the storage device to scan data stored in the storage medium while the storage device is in an idle state; a determining unit that determines whether a proportion of scanned data in entire data in the storage medium is equal to or more than a threshold value; and a second scanning unit that, when the determining unit determines that the proportion of the scanned data is less than the threshold value, causes the storage device to scan unscanned data in the storage medium during a time interval between commands received by the storage device from outside while the storage device is not in an idle state, until the proportion of the scanned data is equal to or more than the threshold value.

According to another aspect of the present invention, there is provided a storage device that scans data stored in a storage medium to locate and correct error in the data. The storage device includes a first scanning unit that scans data stored in the storage medium while the storage device is in an idle state; a determining unit that determines whether a proportion of scanned data in entire data in the storage medium is equal to or more than a threshold value; and a second scanning unit that, when the determining unit determines that the proportion of the scanned data is less than the threshold value, scans unscanned data in the storage medium during a time interval between commands received by the storage device from outside while the storage device is not in an idle state, until the proportion of the scanned data is equal to or more than the threshold value.

According to still another aspect of the present invention, there is provided a method of controlling a storage device to scan data stored in a storage medium of the storage device to locate and correct error in the data. The method includes scanning data stored in the storage medium while the storage device is in an idle state; determining whether a proportion of scanned data in entire data in the storage medium is equal to or more than a threshold value; and scanning, when it is determined at the determining that the proportion of the scanned data is less than the threshold value, unscanned data in the storage medium from outside during a time interval between commands received by the storage device while the storage device is not in an idle state, until the proportion of the scanned data is equal to or more than the threshold value.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a flowchart of a compulsory-BMS mode process performed by the storage device shown in FIG. 1.

DETAILED DESCRIPTION OF THE PREFERRED EMBODIMENTS

Exemplary embodiments of the present invention are explained in detail below with reference to the accompanying drawings.

A storage device (magnetic disk device) according to an embodiment of the present invention is described below. The storage device regularly performs the BMS on data stored in a disk. Meanwhile, the storage device determines whether a completion proportion, which is a proportion of an area where the BMS has been performed in the entire storage area of a disk, is equal to or more than a threshold value. If the completion proportion is less than the threshold value, the storage device compulsorily performs the BMS on the unscanned area on the disk during a time interval between commands received from the higher-level device while the storage device is not in an idle state, until the completion proportion is equal to or more than the threshold value.

In this manner, if the completion proportion is less than the threshold value, the storage device compulsorily performs the BMS on the unscanned area during an interval between commands without waiting for reception of commands to stop. Thus, it is possible to perform the BMS even when the storage device is not in idle state, i.e., when it is receiving commands from the higher-level device.

Figure 1:
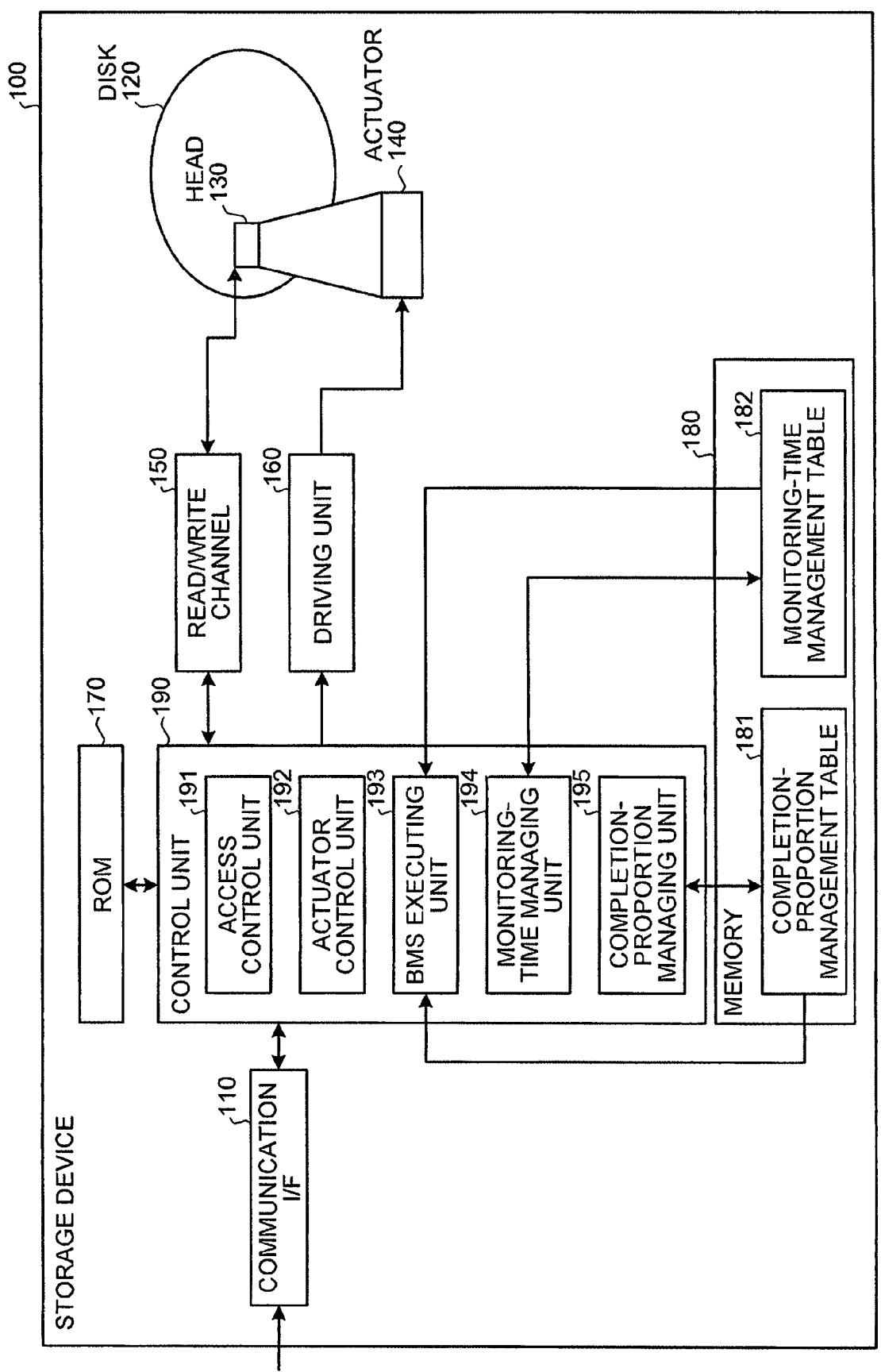
FIG. 1 is a functional block diagram of a storage device according to an embodiment of the present invention.

FIG. 1 is a functional block diagram of a storage device 100 according to the embodiment. The storage device 100 includes a communication interface (I/F) 110, a disk 120, a head 130, an actuator 140, a read/write channel 150, a driving unit 160, a read only memory (ROM) 170, a memory 180, and a control unit 190.

The communication I/F 110 communicates with a higher-level device (not shown) by using a prescribed communication protocol. The disk 120 is a storage medium having a magnetic thin film formed on its substrate to store therein various data such as user data or control data. The storage device 100 performs the BMS on data stored in the disk 120.

The head 130 writes/reads data to/from the disk 120. The head 130 reads a servo signal for controlling a track position of the disk 120, user data, or the like from the disk 120, and outputs the read data to the read/write channel 150.

The actuator 140 includes a voice coil motor (VCM), and moves the head 130 based on a control current received from the driving unit 160. The read/write channel 150 receives a servo signal or user data from the head 130, and outputs the received servo signal or user data to the control unit 190. When the read/write channel 150 receives data to be written on the disk 120 from the control unit 190, the read/write channel 150 outputs the data to the head 130.

The driving unit 160 outputs a control current to the actuator 140 in response to a command from the control unit 190 to control movement of the head 130. The driving unit 160 outputs a control current to a spindle motor (not shown) to control rotation of the disk 120.

The ROM 170 stores therein data and computer programs necessary for performing various processes by the control unit 190. The memory 180 stores therein various data to be used by the control unit 190. Specifically, the memory 180 includes a completion-proportion management table 181 and a monitoring-time management table 182.

Figures 2, 3, 4:
FIG. 2 is an example of contents of a completion-proportion management table shown in FIG. 1.
FIG. 3 is an example of contents of a monitoring-time management table shown in FIG. 1.
FIG. 4 is a schematic diagram for explaining calculation of a compulsory-BMS monitoring time.

The completion-proportion management table 181 contains data in relation to the completion proportion of the BMS on the disk 120. FIG. 2 is an example of contents of the completion-proportion management table 181. The completion-proportion management table 181 contains items such as total number of tracks, completion proportion, threshold value per hour, and threshold value.

Total number of tracks means the total number of tracks present on the disk 120. The completion proportion is data indicative of a proportion of an area to which the BMS has been performed in the entire storage area on the disk 120. The threshold value per hour is the proportion of an area to which the BMS needs to be performed by the storage device 100 per hour (a proportion of an area to which the BMS needs to be performed in the entire storage area on the disk 120).

The threshold value is data indicative of a total threshold value (a total completion proportion of an area to which the BMS needs to be performed by the storage device 100), which is calculated based on the threshold value per hour. When the completion proportion is less than the threshold value, the storage device 100 compulsorily performs the BMS on an unscanned area on the disk 120.

The monitoring-time management table 182 contains data on a period, or the like, at which the storage device 100 determines whether the BMS needs to be compulsorily performed on an unscanned area on the disk 120. FIG. 3 is an example of contents of the monitoring-time management table 182. The monitoring-time management table 182 contains items such as compulsory-BMS monitoring time (X) in hour and period monitoring time (Y) in second.

The compulsory-BMS monitoring time (X) is a time interval at which the storage device 100 is to determine whether the BMS needs to be compulsorily performed. For example, when the compulsory-BMS monitoring time (X) is set to 2 hours, the storage device 100 determines after every 2 hours whether the BMS is to be compulsorily performed.

The period monitoring time (Y) is a period at which, when it is determined that the storage device 100 compulsorily performs the BMS, the BMS is performed on an unscanned area on the disk 120. For example, when the period monitoring time (Y) is set to 10 seconds, the BMS is performed on the unscanned area after every 10 seconds.

The control unit 190 includes an internal memory (not shown) that stores therein control data or computer programs required for performing various procedures. The control unit 190 performs the procedures by using these data or computer programs. As shown in FIG. 1, the control unit 190 includes an access control unit 191, an actuator control unit 192, a BMS executing unit 193, a monitoring-time managing unit 194, and a completion-proportion managing unit 195.

The access control unit 191 receives user data to be stored in the storage device 100 from the higher-level device and outputs the received user data to the read/write channel 150 that stores the user data in the disk 120. On the other hand, the access control unit 191 receives user data from the read/write channel 150, which the read/write channel 150 reads disk 120, the access control unit 191 outputs the received user data to the higher-level device.

The actuator control unit 192 outputs a command to the driving unit 160 to control movement of the head 130. The actuator control unit 192 also controls rotation of the disk 120.

The BMS executing unit 193 performs the BMS on data stored in the disk 120. Specifically, the BMS executing unit 193 compares the completion proportion with the threshold value at intervals of the compulsory-BMS monitoring time (X). If the completion proportion is less than the threshold value, the BMS executing unit 193 proceeds to compulsorily perform the BMS on an unscanned area of the disk 120 (hereinafter, "compulsory BMS process").

When performing the compulsory BMS process, the BMS executing unit 193 performs the BMS on an unscanned area of the disk 120 at intervals of the period monitoring time (Y) while the storage device 100 is not in an idle state. The BMS executing unit 193 continuously performs the BMS until the completion proportion is equal to or more than the threshold value.

When the higher-level device issues commands to the storage device 100 while the BMS executing unit 193 is in a state for performing the compulsory BMS process, the BMS executing unit 193 determines whether the commands are being executed at intervals of the period monitoring time (Y).

When it is determined that the command is being executed, the BMS executing unit 193 performs the BMS during a time-interval between the commands, i.e., after processing of one command is completed and before processing of the next command is started.

The BMS executing unit 193 performs the BMS in a conventional manner, which includes the following processes:

(1) recording information about sectors that have unrecoverable reading error;
(2) rewriting data in sectors that have recoverable reading error; and
(3) replacing a sector if that sector produces some sort of error even after data has been rewritten to that sector.

The monitoring-time managing unit 194 manages the monitoring-time management table 182 stored in the memory 180. The monitoring-time managing unit 194 receives a BMS termination time (x), which is a time to terminate the BMS on the disk 120, and a performance degradation rate (y %) from an input device (not shown) or the higher-level device. The monitoring-time managing unit 194 then calculates the compulsory-BMS monitoring time (X) and the period monitoring time (Y) based on the BMS termination time (x) and the performance degradation rate (y %) to update the monitoring-time management table 182.

FIG. 4 is a schematic diagram for explaining calculation of the compulsory-BMS monitoring time (X). In FIG. 4, the reference numeral (a) denotes a start time at which the BMS starts to be compulsorily executed, and each of the numbers in percentage denotes the completion proportion of an area to which the BMS has been executed. For example, assume that the completion proportion increases by 1% at each compulsory-BMS monitoring time (X), the BMS needs to be performed for the 101 compulsory-BMS monitoring times (X) to complete the BMS in the entire storage area of the disk 120. The compulsory-BMS monitoring time (X) is calculated by using the following equation:

$$X = x/101 \tag{1}$$

If the BMS is compulsorily performed while commands are successively received from the higher-level device, a time for executing the BMS is determined by adding the following times: a seek time for a logical block address (LBA), to which the BMS is performed; an execution time of the BMS; and a seek time to return to an original position. In other words, a time for executing the BMS is determined by adding an average seek time, one rotation time (when only one track is scanned), and another average seek time. The period monitoring time (Y) is determined by calculating the time for executing the BMS with the performance degradation rate (y %), as defined by the following equation:

$$Y = (2 \times \text{average seek time} + \text{one rotation time}) \times 100/y \tag{2}$$

The monitoring-time managing unit 194 retains the average seek time and the one rotation time in advance.

As described above, the monitoring-time managing unit 194 acquires the BMS termination time (x) and the performance degradation rate (y %) to update the monitoring-time management table 182. Thus, the compulsory-BMS monitoring time (X) and the period monitoring time (Y) can be adjusted, so that the degree of the performance degradation of the storage device 100 can be adjusted.

Referring back to FIG. 1, the completion-proportion managing unit 195 manages the completion-proportion management table 181 stored in the memory 180. More specifically, the completion-proportion managing unit 195 updates the completion proportion and the threshold value, which are stored in the completion-proportion management table 181.

The completion-proportion managing unit 195 acquires, from the BMS executing unit 193, information (hereinafter, "scanned area information") indicative of the number of tracks to which the BMS is executed by the BMS executing unit 193 on the disk 120. Based on the scanned area information and the total number of the tracks (see FIG. 2), the completion-proportion managing unit 195 calculates the completion proportion (the number of tracks having the BMS executed/the total number of tracks), to update the completion-proportion management table 181 by the calculated completion proportion. Furthermore, the completion-proportion managing unit 195 increases the threshold value by adding the completion proportion per hour to the threshold value hourly.

Figure 5:
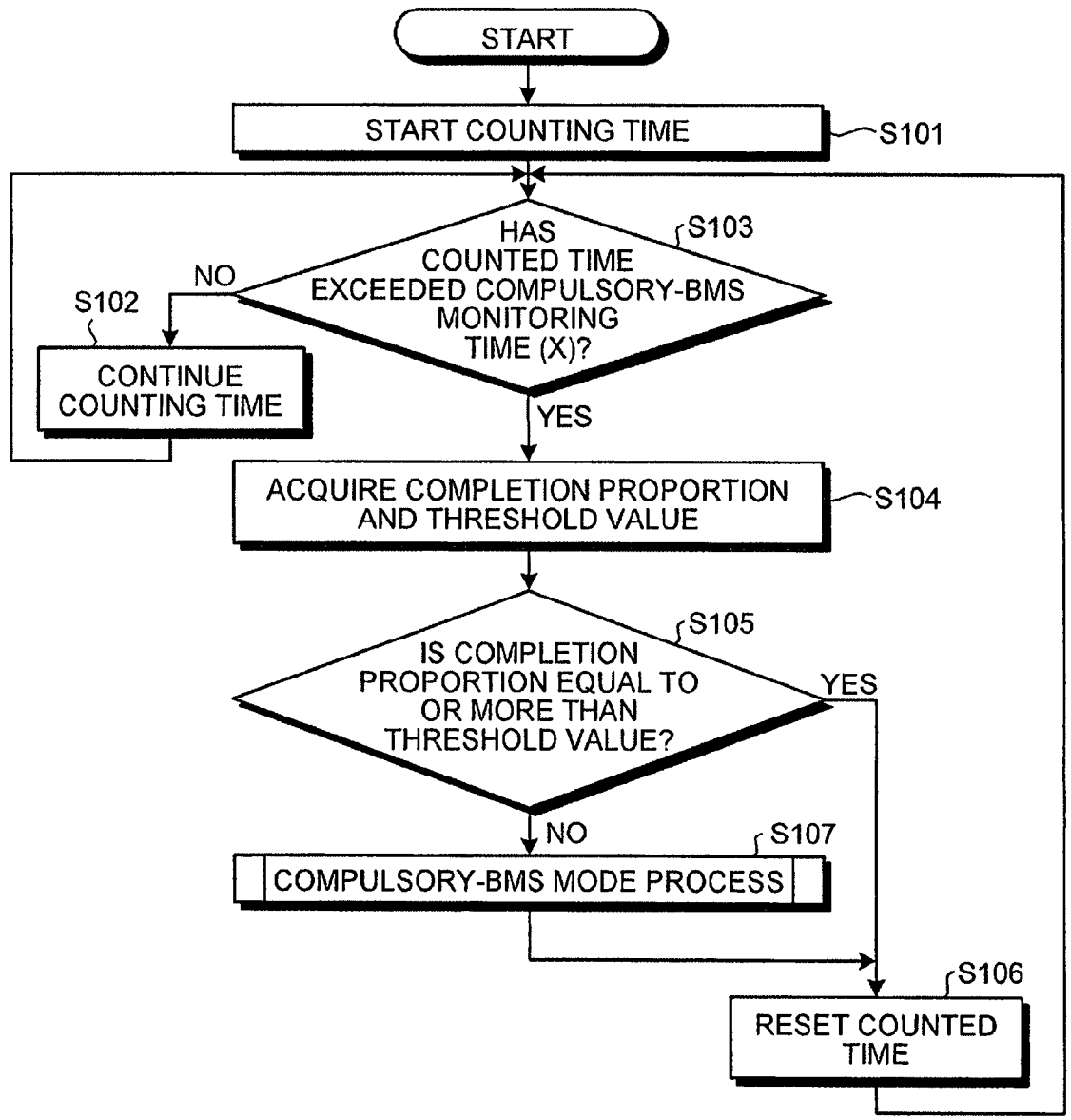
FIG. 5 is a flowchart of a procedure performed by the storage device shown in FIG. 1.

FIG. 5 is a flowchart of a procedure performed by the storage device 100. The BMS executing unit 193 starts counting time (step S110), and determines whether the counted time has exceeded the compulsory-BMS monitoring time (X) (step S103).

When it is determined that the monitoring time does not exceed the compulsory-BMS monitoring time (X) (No at step S103), counting of time is continued (step S102) and the process control returns to step S103. When it is determined that the monitoring time has exceeded the compulsory-BMS monitoring time (X) (Yes at step S103), the BMS executing unit 193 acquires the completion proportion and the threshold value (step S104), and then determines whether the completion proportion is equal to or more than the threshold value (step S105).

When it is determined that the completion proportion is equal to or more than the threshold value (Yes at step S105), the BMS executing unit 193 resets the counted time (step S106), and process control returns to step S103. When it is determined that the completion proportion is less than the threshold value (No at step S105), the BMS executing unit 193 performs compulsory-BMS mode process (step S107), and process control proceeds to step S106.

FIG. 6 is a flowchart of the compulsory-BMS mode process. The BMS executing unit 193 starts to count a period monitoring time (step S201), and then determines whether the period monitoring time has exceeded the period monitoring time (Y) (step S203).

When it is determined that the period monitoring time does not exceed the period monitoring time (Y) (No at step S203), counting of the period monitoring time (Y) is continued (step S202), and the process control returns to step S203. When it is determined that the period monitoring time has exceeded the period monitoring time (Y) (Yes at step S203), the BMS executing unit 193 determines whether a command issued from the higher-level device is being executed (step S204). When it is determined that the command issued from the higher-level device is being executed (Yes at step S204), the BMS executing unit 193 performs the BMS after processing of the command is completed (step S205), and process control proceeds to step S207.

When it is determined that the command issued from the higher-level device is not being executed (No at step S204), the BMS executing unit 193 performs the BMS (step S206), and then determines whether the BMS has been performed on the predetermined number of tracks, i.e., the completion proportion is equal to or more than the threshold value (step S207). When it is determined that the BMS has been performed on the predetermined number of tracks (Yes at step S207), the compulsory BMS mode process terminates. When it is determined that the BMS has not been performed on the predetermined number of tracks (No at step S207), the BMS executing unit 193 resets the period monitoring time (step S208), and process control returns to step S203.

As described above, the BMS executing unit 193 compares the completion proportion with the threshold value, and when the completion proportion is less than the threshold value, the BMS executing unit 193 proceeds to the compulsory-BMS mode process to execute the BMS on an unscanned area. Thus, it is possible to maintain quality of data stored in the disk 120.

In the storage device 100, the BMS executing unit 193 compares the completion proportion with the threshold value at each compulsory-BMS monitoring time (X), to determine whether the completion proportion is equal to or more than the threshold value. When it is determined that the completion proportion is less than the threshold value, the BMS executing unit 193 compulsorily executes the BMS on an unscanned area on the disk 120 at intervals of the period monitoring time (Y) during a time interval between commands issued from the higher-level device while the storage device 100 is not in an idle state, until the completion proportion is equal to or more than the threshold value. Thus, it is possible to prevent degradation of data stored in a disk is left as it is without having the BMS performed.

As described above, the monitoring-time managing unit 194 calculates the compulsory-BMS monitoring time (X) and the period monitoring time (Y) based on the BMS termination time (x) and the performance degradation rate (y %) to update the monitoring-time management table 182. Thus, a level of the performance degradation, which is caused by compulsorily executing the BMS, of the storage device 100 can be adjusted.

The above-described various processes can be realized by executing a computer program by the storage device (computer). In the example shown in connection with FIG. 1, the ROM 170 stores therein various computer programs for realizing the processes, and the control unit 190 reads and executes the computer programs stored in the ROM 170 to start the processes for achieving functions of the processing units (the access control unit 191, the actuator control unit 192, the BMS executing unit 193, the monitoring-time managing unit 194, and the completion-proportion managing unit 195).

The computer programs need not be necessarily stored in a ROM in advance. For example, the computer programs can be stored in portable physical media to be inserted into a computer, such as a flexible disk (FD), a CD-ROM, a DVD disk, a magnetic optical disk, or an integrated circuit (IC) card, or other computers (servers) that are connected to the computer through a public line, the Internet, a local area network (LAN), a wide area network (WAN), or the like, so that the computer reads and executes the programs from the portable physical media or the other computers.

Although the embodiments of the present invention have been described above, the present invention can be embodied with various other embodiments within the scope of the technical idea set forth in claims.

All or part of the processes, which are automatically performed in the embodiment, can be manually performed, or all or part of the processes, which are manually performed in the embodiment can be automatically performed in the conventional manner.

The processing procedures, the control procedures, the specific names, the various data and parameters described in the specification and the drawings can be changed appropriately, except for the one with a special note.

The components of each of the devices shown in the drawings are arranged functionally and conceptually, and the components are not necessarily arranged physically in the manner as shown in the drawings. More specifically, an integrated or disintegrated form of the components is not limited to those shown in the drawings. It is possible to integrate or disintegrate all or part of the components functionally or physically in a predetermined unit of the components depending on load status or status of use.

According to an aspect of the present invention, it is possible to perform the BMS in an environment where a storage device continuously and periodically receives commands from a higher-level device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device that controls a storage device to scan data stored in a storage medium of the storage device to locate and correct error in the data, the control device comprising:
   a first scanning unit that causes the storage device to scan data stored in the storage medium while the storage device is in an idle state;
   a determining unit that determines whether a proportion of scanned data in entire data in the storage medium is equal to or more than a threshold value;
   a second scanning unit that, when the determining unit determines that the proportion of the scanned data is less than the threshold value, causes the storage device to scan unscanned data in the storage medium during a time interval between commands received by the storage device from outside while the storage device is not in an idle state, until the proportion of the scanned data is equal to or more than the threshold value; and
   a threshold value managing unit that manages the threshold value, and increases the threshold value at a predetermined rate over time.

2. The control device according to claim 1, wherein the determining unit performs determination of whether the proportion of the scanned data is equal to or more than the threshold value at first time intervals.

3. The control device according to claim 2, wherein the second scanning unit determines whether a command received by the storage device is being executed at second time intervals, and when it is determined that the command is not being executed, the second scanning unit scans the unscanned data.

4. The control device according to claim 3, wherein the second scanning unit determines whether a command received by the storage device is being executed at the second time intervals, and when it is determined that the command is being executed, the second scanning unit scans the unscanned data after processing of the command is completed.

5. The control device according to claim 3, the control device further comprising a time-interval managing unit that manages the first time interval and the second time interval, wherein the time-interval managing unit calculates the first time interval and the second time interval based on a scan termination time specified by a user and a performance degradation rate of the storage device.

6. A storage device that scans data stored in a storage medium to locate and correct error in the data, the storage device comprising:
   a first scanning unit that scans data stored in the storage medium while the storage device is in an idle state;

a determining unit that determines whether a proportion of scanned data in entire data in the storage medium is equal to or more than a threshold value;

a second scanning unit that, when the determining unit determines that the proportion of the scanned data is less than the threshold value, scans unscanned data in the storage medium during a time interval between commands received by the storage device from outside while the storage device is not in an idle state, until the proportion of the scanned data is equal to or more than the threshold value; and a threshold value managing unit that manages the threshold value, and increases the threshold value at a predetermined rate over time.

7. The storage device according to claim 6, wherein the determining unit performs determination of whether the proportion of the scanned data is equal to or more than the threshold value at first time intervals.

8. The storage device according to claim 7, wherein the second scanning unit determines whether a command received by the storage device is being executed at second time intervals, and when it is determined that the command is not being executed, the second scanning unit scans the unscanned data.

9. The storage device according to claim 8, wherein the second scanning unit determines whether a command received by the storage device is being executed at the second time intervals, and when it is determined that the command is being executed, the second scanning unit scans the unscanned data after processing of the command is completed.

10. The storage device according to claim 8, the control device further comprising a time-interval managing unit that manages the first time interval and the second time interval, wherein the time-interval managing unit calculates the first time interval and the second time interval based on a scan termination time specified by a user and a performance degradation rate of the storage device.

11. A method of controlling a storage device to scan data stored in a storage medium of the storage device to locate and correct error in the data, the method comprising:

scanning data stored in the storage medium while the storage device is in an idle state;

determining whether a proportion of scanned data in entire data in the storage medium is equal to or more than a threshold value;

scanning, when it is determined at the determining that the proportion of the scanned data is less than the threshold value, unscanned data in the storage medium from outside during a time interval between commands received by the storage device while the storage device is not in an idle state, until the proportion of the scanned data is equal to or more than the threshold value; and managing the threshold value, wherein the managing includes increasing the threshold value at a predetermined rate over time.

12. The method according to claim 11, wherein the determining includes performing determination of whether the proportion of the scanned data is equal to or more than the threshold value at first time intervals.

13. The method according to claim 12, wherein the scanning unscanned data includes determining whether a command received by the storage device is being executed at second time intervals, and scanning the unscanned data when it is determined that the command is not being executed.

14. The method according to claim 13, wherein the scanning unscanned data includes determining whether a command received by the storage device is being executed at the second time intervals, and scanning the unscanned data after processing of the command is completed when it is determined that the command is being executed.

15. The method according to claim 13, further comprising managing the first time interval and the second time interval, wherein the managing includes calculating the first time interval and the second time interval based on a scan termination time specified by a user and a performance degradation rate of the storage device.

\* \* \* \* \*